Oct. 18, 1960 L. A. PRANTER 2,956,582

VALVE

Filed Sept. 2, 1958 2 Sheets-Sheet 1

INVENTOR.
Lawrence A. Pranter.

BY Fishburn & Gold

ATTORNEYS.

VALVE
Filed Sept. 2, 1958
2 Sheets-Sheet 2
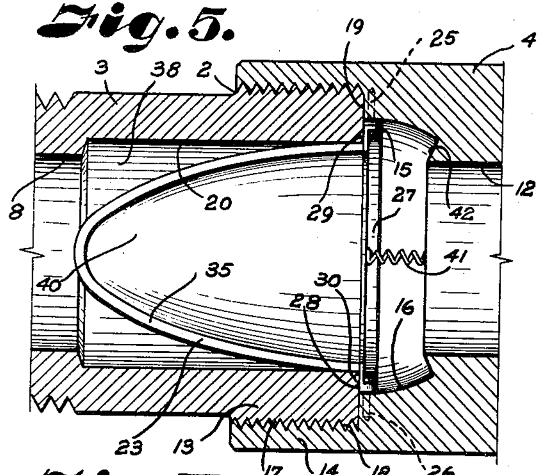
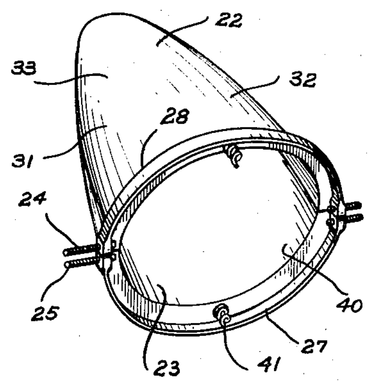
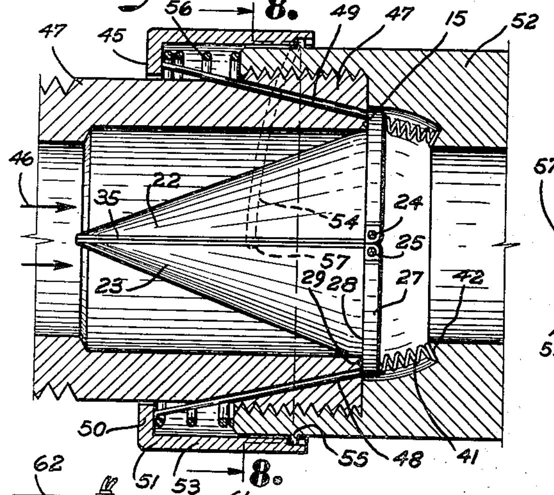
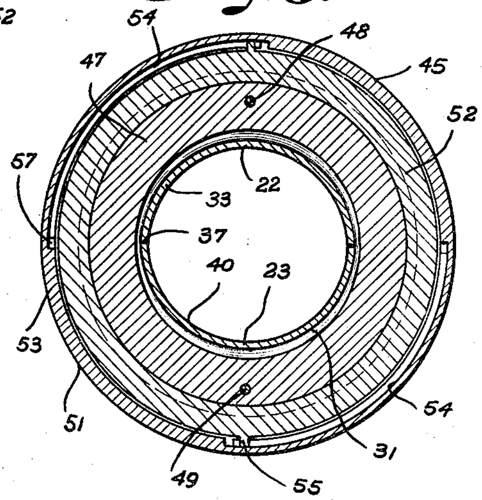
Fig. 9.
62 61 60 49 56 52 47 38 16 27 22 37 24 35 28 25 23 41 42 58 59
INVENTOR.
Lawrence A. Pranter.
BY Fishburn & Gold
ATTORNEYS.

United States Patent Office 2,956,582

Patented Oct. 18, 1960

2,956,582

VALVE

Lawrence A. Pranter, 6801 Kiami, Tucson, Ariz.

Filed Sept. 2, 1958, Ser. No. 758,219

8 Claims. (Cl. 137—512.1)

This invention relates to valves, and more particularly to valves having pairs of swing valve elements or members for controlling flow of fluids through flow lines.

The principal objects of the present invention are to provide a valve structure having a body with a flow passage and a pair of swing valve members in the flow passage which, when in open position, provide substantially full, unobstructed flow therethrough; to provide such a valve structure in which the swing valve members are of generally clamshell shape; to provide such a valve structure with a body of two separable sections with the swing valve members mounted in one section and engageable with the other section for closing the flow passage therethrough; to provide such a valve structure in which a predetermined fluid flow will hold the swing valve members in open position but reduction in fluid flow will allow said swing valve members to move to passage closing position; to provide such a valve structure with swing valve members pivoted on parallel axes adjacent the center or axis of the flow passage and having interengaging edges to effect a seal therebetween when in closed position, said swing valve members having surfaces extending substantially from the pivoted axes whereby fluid pressure on said surfaces at the exterior of the valve members being greater than the fluid pressure acting on the inner surfaces of said valve members will hold said valve members in sealing engagement in closed position; to provide such a valve structure with operating members for selectively moving the swing valve members to open position; and to provide a valve structure with swinging valve elements that is economical to manufacture, efficient in operation, easy to maintain, and that is positive in action for full unobstructed flow or for closing the flow passage.

Other objects and advantages of this invention will become apparent from the following description taken in connection with the accompanying drawings, wherein are set forth by way of illustration and example certain embodiments of this invention.

Fig. 5 is a longitudinal sectional view through the valve structure on the line 5—5, Fig. 1.

Fig. 6 is a perspective view of the swing valve elements.

Fig. 7 is a partial longitudinal sectional view through a modified form of valve structure with operating means to move the swing valve members to open position.

Fig. 8 is a transverse sectional view through the valve structure on the line 8—8, Fig. 7.

Fig. 9 is a partial longitudinal sectional view through the valve structure with a further modified form of actuator.

Figure 1:
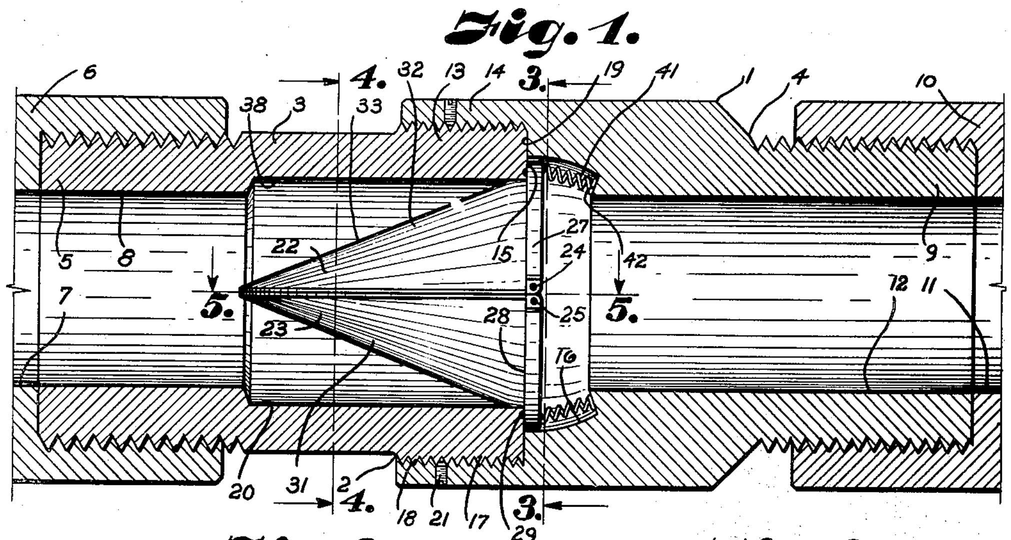
Fig. 1 is a longitudinal sectional view through a valve structure embodying the features of the present invention, and arranged to act as a check valve.

Referring more in detail to the drawings:

One designates a valve structure having an elongate valve body 2 preferably consisting of separable sections 3 and 4 adapted to be connected in a conduit or other flow line. In the illustrated structure, the section 3 has a remote end portion 5 suitably secured as by threading into a flow pipe 6 whereby the bore 7 of the pipe communicates with an axial bore or flow passage 8 in said body section 3.

The body section 4 has a remote end portion 9 suitably secured as by threading into a pipe section 10 whereby the bore 11 of said pipe communicates with an axial bore or flow passage 12 in the body section 4. The adjacent end portions 13 and 14 of the body sections 3 and 4 are suitably connected together whereby the end of the body section 3 forms an annular shoulder or seating surface 15 at one end of an annular recess 16 or enlarged portion of the flow passage in the body section 4. In the illustrated structure, the adjacent end portion 13 of the body section 3 has external threads 17 which are screwed into an internally threaded bore 18 in the adjacent end portion 14 of the body section 4. The threaded bore 18 terminates in a shoulder 19 adapted to be engaged by the end of the body section 3 as illustrated in Fig. 1. The body section 3 at the adjacent end thereof is provided with a counterbore or enlarged portion 20 which is preferably larger than the bore 8 but smaller than the recessed portion or counterbore 16 in the body portion 4 to provide the seating shoulder or face 15 surrounding said counterbore 20 and in a plane perpendicular to the flow passage. It is preferable that set screws 21 or other suitable fastening devices be arranged in the body section 4 and engaging the threaded portion of the body section 3 to lock said sections together.

Figure 3:
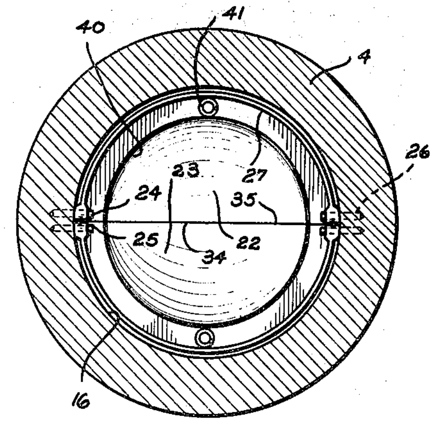
Fig. 3 is a transverse sectional view through the valve structure on the line 3—3, Fig. 1.
Figure 4:
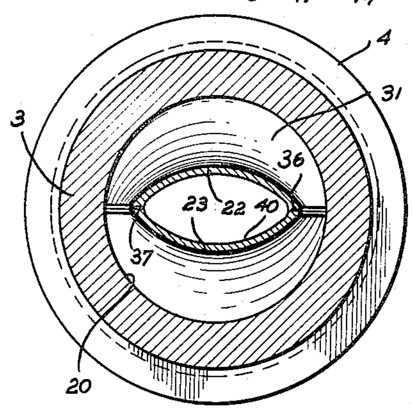
Fig. 4 is a transverse sectional view through the valve structure on the line 4—4, Fig. 1.

A pair of swing valve members 22 and 23 are pivotally mounted on suitable parallel pins or pivot members 24 and 25 respectively defining parallel axes for said valve members, said pins 24 and 25 extending into the wall of the valve section 4 at the recessed portion 16 adjacent the shoulder 19. While said pins could extend across the flow passage in the form of shafts, it is preferable that the flow passage be unobstructed and, therefore, in the illustrated structure the pins are in the form of screws threaded into threaded sockets 26 in the wall of the body section 4 adjacent the diameter or center of the flow passage, as illustrated in Fig. 3. The swing valve members 22 and 23 each preferably have a flange 27 at the pivoted end thereof which when the valve members are in closing position, as illustrated in Fig. 1, cooperate to form a substantially annular ring-like portion having a face 28 substantially engaging the shoulder 15. It is preferable that a suitable seal member such as an O-ring or the like 29 be arranged in a groove 30 in the shoulder 15 and adapted to be engaged by the flange face 28 to cooperate therewith to make a substantially continuous seal around the flow passage through the valve body. Each of the swing valve members 22 and 23 are substantially the same in shape and may be termed as "clamshell" in shape. Said valve members extend from the flanged ends into the counterbore 20 and at the portion adjacent the flanges 27 the outer faces 31 of said valve members are rounded substantially on a radius from the pins 24 and 25 whereby said outer faces in the portion 32 of said members will closely engage the inner face of the wall of the body section 3 and the counterbore 20 adjacent the shoulder 15.

Figure 2:
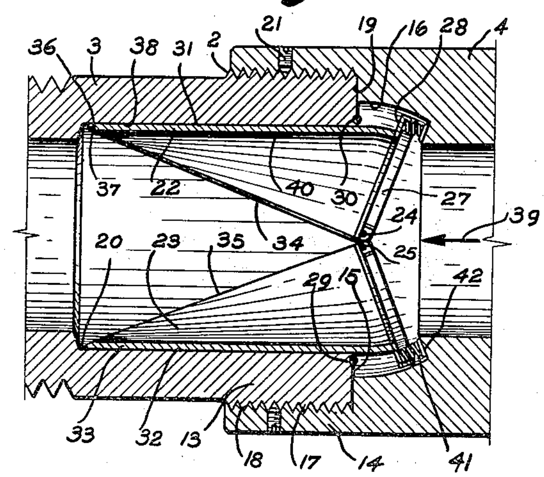
Fig. 2 is a partial longitudinal sectional view through the valve structure with the swing valve members in open position.

The clamshell valve members have walls 33 extending from the flanges 27 in a modified cone-like shape with the adjacent edges 34 and 35 at the sides thereof engaged on a diametrical plane parallel to the axes of the pins 24 and 25, the plane formed by said edges 34 and 35 being perpendicular to the flanges 27 of the respective valve member. It is preferable that one of the edges, for example the edge 34, be provided with a recess 36 having a suitable gasket 37 such as an O-ring therein or other resilient gaskets to be engaged by the other edge 35 to facilitate the seal therebetween when the valve members are in closing position. The shape of the outer surface of the valve members 22 and 23 extending from the flanges 27 is such that when the members are moved to flow passage opening position as illustrated in Fig. 2, said outer surfaces 31 will substantially conform to the inner surface 38 of the counterbore 20 of the body section 3. The recessed portion 16 in the body section 4 is of such length and shape that the flanges 27 may move therein during movement of the valve members from full open to fully closed position.

In the form of the invention illustrated in Figs. 1 to 6 inclusive, the valve structure is adapted to be used as a check valve as, for example, when the normal flow of fluid is as indicated by the arrow 39 from the pipe 10 toward the pipe 6, the fluid flow will create forces acting on the inner surfaces 40 of the valve member walls 33 in downstream relation to the pivot axes of the pins 24 and 25 creating a moment of force to swing the valve members 22 and 23 to open position as shown in Fig. 2. In order to assure that the valve members will function properly in all attitudes or positions of the valve structure, it is preferable to provide light springs 41 each having one end substantially engaging a shoulder 42 at the upstream end of the recessed portion 15 and the other end portion engaging the flange 27 to provide a slight pressure or force tending to move the swing valve members to passage closing position. The spring force is easily overcome by the forces from the flowing fluid due to the area and its spacing from the pivot axes of the valve members. However, if the flow stops or if there should be a reverse flow in the line, that is from the pipe 6 toward the pipe 10, the springs 41 will start to move the valve members 22 and 23 to passage closing position, and then the force from the reverse flow of the fluid will act on the outer surface of the valve members 22 and 23 and the portion thereof extending from the flanges 27 providing a resultant force to effect a rotational torque acting on the valve members to move same to passage closing position, and then the springs will hold the valve members in closed position with the faces 28 of the flanges in sealing engagement with the O-ring 29 and the edge 35 in sealing engagement with the O-ring 37 to positively shut off flow in the flow passage until the flow from the pipe 10 provides sufficient force acting on the valve members to move same to open position. When the valve members are in open position, as shown in Fig. 2, there is free unobstructed flow through the valve, and the shape of the valve members and the arrangement of the surfaces thereof relative to the pivot axes is such that the valve will operate to move to open or closed position with relatively small differential pressures. This also provides a very fast operation so as to be substantially instantaneous in the event of reverse flow in a check valve of this structure.

In the form of the invention illustrated in Figs. 7 and 8, there is an actuating mechanism 45 for moving the swing valve members 22 and 23 to open position. In this form of the invention, the normal flow through the flow passage may be in the direction of the arrows 46, and the force from the fluid, together with the force from the springs 41, tends to hold the swing valve members in passage closing position in the same manner as described relative to reverse flow in the form of the invention illustrated in Figs. 1 to 6 inclusive. In order to open the valve members, the body section 47 has bores 48 extending from the exterior of said body section in inclined relation relative to the flow passage and opening at the shoulder 15. Pins or rods 49 are slidably mounted in the bores 48 with at least one pin for each of the valve members 22 and 23 and of sufficient length whereby one end of each pin engages a flange 27 of the valve members and the other end of each of said pins engages a flange 50 of a sleeve 51 rotatably and slidably mounted on the body section 47 and body section 52 with the peripheral wall 53 of said sleeve extending over the end portion of said body section 52, said sleeve wall 53 having internal grooves 54 into which extend lugs 55 extending radailly from the body section 52. Rotation of the sleeve member 51 through the inter-engagement of the grooves 54 and lugs 55 moves the flange 50 toward the body section 52 in response to clockwise rotation of said sleeve member when viewed from the flange end of said sleeve member, thereby moving the pins 49 in the bores 48 to apply pressure to the flanges 27 to overcome the pressure of the springs 40 and the forces of the fluid tending to keep the valve members closed whereby the valve members 22 and 23 are swung to open position. A spring 56 is arranged in the sleeve 51 with its ends engaged with the flange 50 and the end of the body section 52 to tend to urge the sleeve away from the body section 52 and aid in retractive movement of the sleeve when rotated in a counter-clockwise direction.

With a valve structure constructed as described, and assuming the valve members to be in closed position and the flow in the direction of the arrow 46, when it is desired to open the valve the sleeve member 51 is rotated in a clockwise direction, moving the pins 49 and forcing the valve members 22 and 23 to open position. The grooves 54 have an offset portion 57 at the end thereof into which the lugs 55 move whereby the sleeve is retained in its rotated position to retain the valve members 22 and 23 in passage open position until the operator rotates the sleeve 51 in counterclockwise direction to retract the sleeve whereby the pressure of the springs 41 will tend to move the valve members 22 and 23 to passage closing position. When the valve members are in passage closing position, the flanges 27 engage the seals 29 and the edge 35 of the valve member 23 engages the seal 37 and the edge of the valve member 22 to provide a positive seal closing the flow through the flow passage.

In the form of the invention illustrated in Fig. 9, the swing valve members and body sections are the same as illustrated and described in the form of the invention illustrated in Figs. 7 and 8. The valve operating mechanism includes a sleeve 58 having a longitudinal groove 59 therein engaging over the lug 60 on the valve body section 52, and the sleeve 58 is connected by a rod 61 to a piston 62 or other suitable actuator such as a solenoid which, when actuated or energized, moves the rod 61 and sleeve 58 toward the body section 52 to move the pins 49 and valve members 22 and 23 to passage opening position. When the actuator 62 is released or de-energized, the spring 56 moves the sleeve 58 to the left, Fig. 9, whereby the springs 41 urge the valve members 22 and 23 to passage closing position.

It is to be understood that while I have illustrated and described certain forms of my invention, it is not to be limited to the specific forms or arrangements of parts herein described and shown except insofar as such limitations are included in the claims.

What I claim and desire to secure by Letters Patent is:

1. A valve for flow lines comprising, a valve body having a flow passage therethrough with an enlarged portion of said passage terminating in a shoulder extending around the flow passage, cooperating valve members in said flow passage, means pivotally mounting said valve members for swinging movement about parallel axes extending substantially through the center of said flow passage and at right angles to the axis thereof, said valve members having walls extending from said pivot means and defining a passage substantially corresponding in shape to the flow passage for unobstructed flow therethrough when the valve members are in passage open position, said valve member walls having side edges on diagonals extending from adjacent the pivot means, and an annular flange on each valve member in a plane perpendicular to the plane formed by the side edges of the respective valve member walls whereby when the valve members are moved to passage closing position the side edges of the walls of said valve members are in contact and the annular flanges contact the annular shoulder in sealing engagement to stop flow through the flow passage.

2. A valve for flow lines comprising, a valve body having a flow passage therethrough with an enlarged portion of said passage terminating in an annular shoulder extending around the flow passage and in a plane perpendicular thereto, cooperating valve members in said flow passage, means pivotally mounting said valve members for swinging movement about parallel axes extending substantially through the center of said flow passage and at right angles to the axis thereof, said valve members having walls extending from said pivot means and defining a passage substantially corresponding in shape to the flow passage for unobstructed flow therethrough when the valve members are in passage open position, said valve member walls having side edges on diagonals extending from adjacent the pivot means, an annular flange on each valve member in a plane perpendicular to the plane formed by the side edges of the respective valve member walls whereby when the valve members are moved to passage closing position the side edges of the walls of said valve members are in contact and the annular flanges contact the annular shoulder in sealing engagement to stop flow through the flow passage, and means between the valve body and valve members urging said valve members toward passage closing position.

3. A valve for flow lines comprising, a valve body having a flow passage therethrough, said valve body having an enlarged portion of the flow passage intermediate the ends thereof, an annular recess in the valve body at one end of the enlarged portion of the flow passage and defining an annular shoulder therebetween and extending around the flow passage in a plane perpendicular thereto, cooperating valve members in said annular recess with walls extending longitudinally into the elongated enlarged portion of the flow passage, means pivotally mounting said valve members for swinging movement about parallel axes in the annular recess adjacent said annular shoulder, said parallel axes extending substantially through the center of the flow passage and at right angles to the axis thereof, and annular flanges on each of said valve members in the annular recess for movement into sealing engagement with the annular shoulder, the extending walls of the valve members extending from said annular flanges and having outer surfaces substantially corresponding in shape to the inner surface of the enlarged portion of the flow passages, said valve member walls each having side edges on diagonals extending from adjacent the pivot means and in planes substantially perpendicular to the plane of the flanges of the respective valve member whereby when the valve members are moved to passage closing position the side edges of the walls of said valve members contact in sealing engagement and the annular flanges contact the annular shoulder in sealing engagement to shut off flow through the valve flow passage, and when moved to open position the walls of the valve members are positioned adjacent the walls defining the enlarged portion of the flow passage for unobstructed flow therethrough.

4. A valve for flow lines comprising, a valve body having a flow passage therethrough, said valve body having an enlarged portion of the flow passage intermediate the ends thereof, an annular recess in the valve body at one end of the enlarged portion of the flow passage and defining an annular shoulder therebetween and extending around the flow passage in a plane perpendicular thereto, cooperating valve members in said annular recess with walls extending longitudinally into the elongated enlarged portion of the flow passage, means pivotally mounting said valve members for swinging movement about parallel axes in the annular recess adjacent said annular shoulder, said parallel axes extending substantially through the center of the flow passage and at right angle to the axis thereof, said valve members each having annular flanges in the annular recess for movement into sealing engagement with the annular shoulder, the extending walls of the valve members extending from said annular flanges and having outer surfaces substantially corresponding in shape to the inner surface of the enlarged portion of the flow passages, said valve member walls each having side edges on diagonals extending from adjacent the pivot means and in planes substantially perpendicular to the plane of the flanges of the respective valve member whereby when the valve members are moved to passage closing position the side edges of the walls of said valve members contact in sealing engagement and the annular flanges contact the annular shoulder in sealing engagement to shut off flow through the valve flow passage, and when moved to open position the walls of the valve members are positioned adjacent the walls defining the enlarged portion of the flow passage for unobstructed flow therethrough, and means between the valve body and valve members urging said valve members toward passage closing position.

5. A valve for flow lines comprising, a valve body having a flow passage therethrough, said valve body having an enlarged portion of the flow passage intermediate the ends thereof, an annular recess in the valve body at one end of the enlarged portion of the flow passage and defining an annular shoulder therebetween and extending around the flow passage in a plane perpendicular thereto, cooperating valve members in said annular recess with walls extending longitudinally into the elongated enlarged portion of the flow passage, means pivotally mounting said valve members for swinging movement about parallel axes in the annular recess adjacent said annular shoulder, said parallel axes extending substantially through the center of the flow passage and at right angles to the axis thereof, said valve members each having annular flanges in the annular recess for movement into sealing engagement with the annular shoulder, the extending walls of the valve members extending from said annular flanges and having outer surfaces substantially corresponding in shape to the inner surface of the enlarged portion of the flow passages, said valve member walls each having side edges on diagonals extending from adjacent the pivot means and in planes substantially perpendicular to the plane of the flanges of the respective valve member whereby when the valve members are moved to passage closing position the side edges of the walls of said valve members contact in sealing engagement and the annular flanges contact the annular shoulder in sealing engagement to shut off flow through the valve flow passage, and when moved to open position the walls of the valve members are positioned adjacent the walls defining the enlarged portion of the flow passage for unobstructed flow therethrough, means between the valve body and valve members urging said valve members toward passage closing position, and means movably mounted on the exterior of the valve body and having connection with the valve members for moving the valve members to passage opening position.

6. A valve for flow lines comprising, a valve body having separable body sections with each of said sections having an aligned flow passage therethrough, means removably securing adjacent ends of the valve body sections together, one of said valve body sections having an enlarged portion of the flow passage adjacent the adjacent end thereof, said other body section having a portion of the flow passage larger than said enlarged portion in the first-named body section and adjacent the end thereof to form an annular shoulder at said adjacent end of the first-named valve body section, said annular shoulder extending around the flow passage and in a plane perpendicular thereto, cooperating valve members in said flow passage, and means pivotally mounting said valve members for swinging movement about parallel axes extending substantially through the center of said flow passage and at right angles to the axis thereof, said valve members each having annular flanges for movement into sealing engagement with the annular shoulder, said valve members having walls extending from said annular flanges and having outer surfaces substantially corresponding in shape to the inner surface of the enlarged portion of the flow passages, said valve member walls each having side edges on diagonals extending from adjacent the pivot means and in planes substantially perpendicular to the plane of the flanges of the respective valve member whereby when the valve members are moved to passage closing position the side edges of the walls of said valve members contact in sealing engagement and the annular flanges contact the annular shoulder in sealing engagement to shut off flow through the valve flow passage, and when moved to open position the walls of the valve members are positioned adjacent the walls defining the enlarged portion of the flow passage for unobstructed flow therethrough.

7. A valve for flow lines comprising, a valve body having separable body sections with each of said sections having an aligned flow passage therethrough, means removably securing adjacent ends of the valve body sections together, one of said valve body sections having an enlarged portion of the flow passage adjacent the adjacent end thereof, said other body section having a portion of the flow passage larger than said enlarged portion in the first-named body section defining an annular recess adjacent the end of said other body section to form an annular shoulder at said adjacent end of the first-named valve body section, said annular shoulder extending around the flow passage and in a plane perpendicular thereto, cooperating valve members in said annular recess with walls extending longitudinally into the elongated enlarged portion of the flow passage, means pivotally mounting said valve members for swinging movement about parallel axes in the larger portion of the flow passage of said other body section adjacent said annular shoulder, said parallel axes extending substantially through the center of the flow passage and at right angles to the axis thereof, said valve members each having annular flanges for movement into sealing engagement with the annular shoulder, the extending walls of the valve members extending from said annular flanges and having outer surfaces substantially corresponding in shape to the inner surface of the enlarged portion of the flow passages, said valve member walls each having side edges on diagonals extending from adjacent the pivot means and in planes substantially perpendicular to the plane of the flanges of the respective valve member whereby when the valve members are moved to passage closing position the side edges on the walls of said valve members contact in sealing engagement and the annular flanges contact the annular shoulder in sealing engagement to shut off flow through the valve flow passage, and when moved to open position the walls of the valve members are positioned adjacent the walls defining the enlarged portion of the flow passage for unobstructed flow therethrough, and means movably mounted on the exterior of the valve body and having connection with the valve members for moving the valve members to passage opening position.

8. A valve for flow lines comprising, a valve body having separable body sections with each of said sections having an aligned flow passage therethrough, means removably securing adjacent ends of the valve body sections together, one of said valve body sections having an enlarged portion of the flow passage adjacent the adjacent end thereof, said other body section having a portion of the flow passage larger than said enlarged portion in the first-named body section defining an annular recess adjacent the end of said other body section to form an annular shoulder at said adjacent end of the first-named valve body section, said annular shoulder extending around the flow passage and in a plane perpendicular thereto, cooperating valve members in said annular recess with walls extending longitudinally into the elongated enlarged portion of the flow passage, means pivotally mounting said valve members for swinging movement about parallel axes in the larger portion of the flow passage of said other body section adjacent said annular shoulder, said parallel axes extending substantially through the center of the flow passage and at right angles to the axis thereof, said valve members each having annular flanges for movement into sealing engagement with the annular shoulder, the extending walls of the valve members extending from said annular flanges and having outer surfaces substantially corresponding in shape to the inner surface of the enlarged portion of the flow passages, said valve member walls each having side edges on diagonals extending from adjacent the pivot means and in planes substantially perpendicular to the plane of the flanges of the respective valve member whereby when the valve members are moved to passage closing position the side edges of the walls of said valve members contact in sealing engagement and the annular flanges contact the annular shoulder in sealing engagement to shut off flow through the valve flow passage, and when moved to open position the walls of the valve members are positioned adjacent the walls defining the enlarged portion of the flow passage for unobstructed flow therethrough, means between the valve body and valve members urging said valve members toward passage closing position, and means movably mounted on the exterior of the valve body and having connection with the valve members for moving the valve members to passage opening position.

References Cited in the file of this patent

UNITED STATES PATENTS 149,430 Bowen ---------------- Apr. 7, 1874
586,618 Noll ---------------- July 20, 1897
2,849,861 Gardiner ---------------- Sept. 2, 1958

FOREIGN PATENTS 20,241 Great Britain ---------------- of 1908